Dec. 2, 1924.

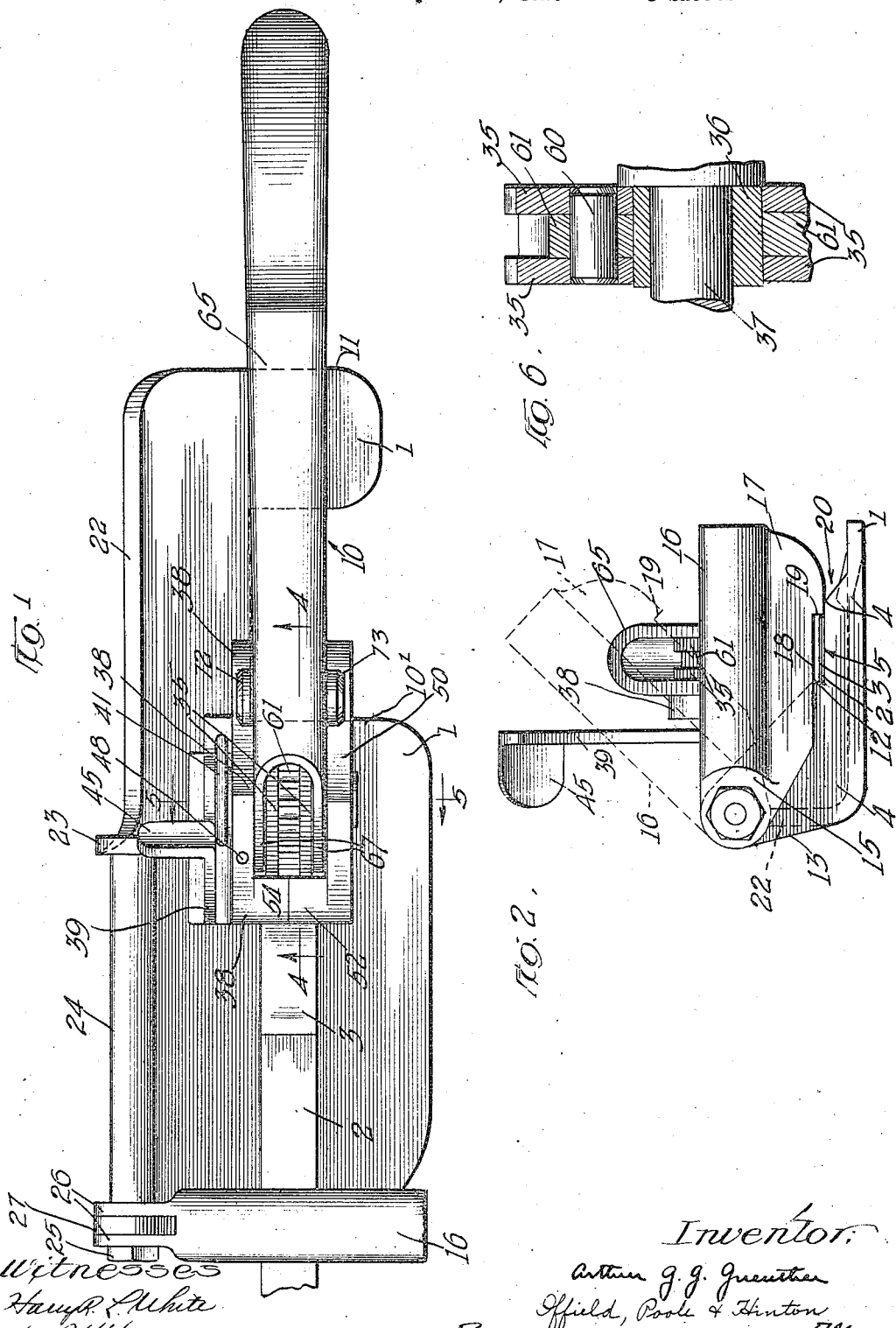

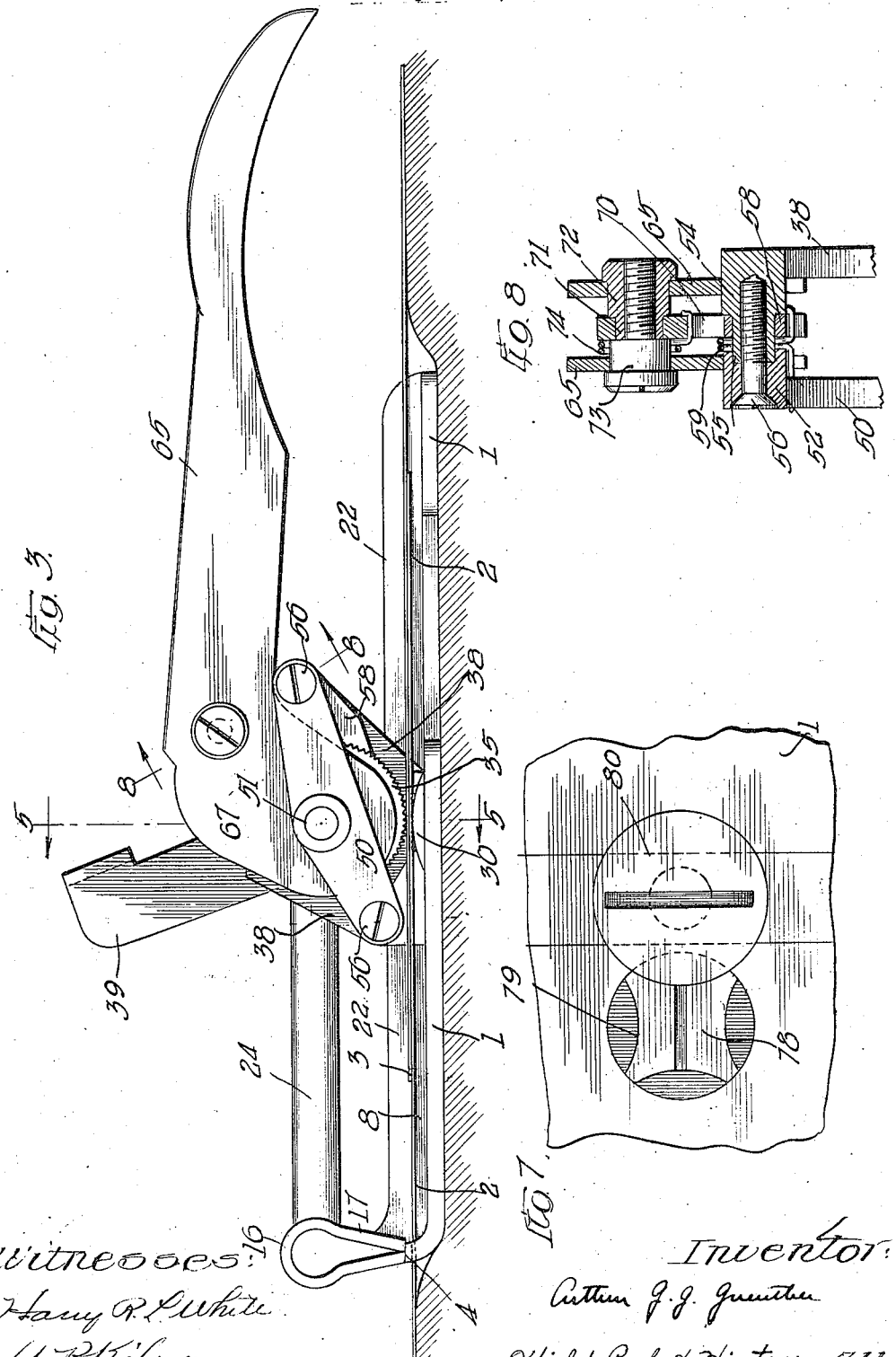

A. G. G. GUENTHER

STRETCHING TOOL

Filed April 29, 1920   3 Sheets-Sheet 3

Patented Dec. 2, 1924.

1,517,903

UNITED STATES PATENT OFFICE.

ARTHUR G. G. GUENTHER, OF CHICAGO, ILLINOIS, ASSIGNOR TO SIGNODE SYSTEM, INC., OF CHICAGO, ILLINOIS, A CORPORATION OF DELAWARE.

STRETCHING TOOL.

Application filed April 29, 1920. Serial No. 377,699.

*To all whom it may concern:*

Be it known that I, ARTHUR G. G. GUENTHER, a citizen of the United States, and resident of Chicago, in the county of Cook and State of Illinois, have invented a certain new and useful Improvement in Stretching Tools, of which the following is a full, clear, concise, and exact description, reference being had to the accompanying drawing, forming a part of this specification.

This invention relates to stretching devices for box strapping or the like, and it is the object of the invention to produce a device of the character described, simple, economical and convenient in construction and having certain marked advantages in operation which will hereinafter be more fully pointed out.

In the drawings:

Fig. 1 is a plan view of the stretcher made according to my invention;

Fig. 2 is an end elevation thereof;

Fig. 3 is a side elevation thereof;

Fig. 6 is a sectional elevation on the line 6—6 of Fig. 4, and looking in the direction of the arrows in Fig. 4.

Fig. 7 is a detailed bottom view showing the locking means for the clutch plug;

Fig. 8 is a sectional elevation on the line 8—8 of Fig. 3 looking in the direction indicated by the arrows in Fig. 3.

Figure 4:
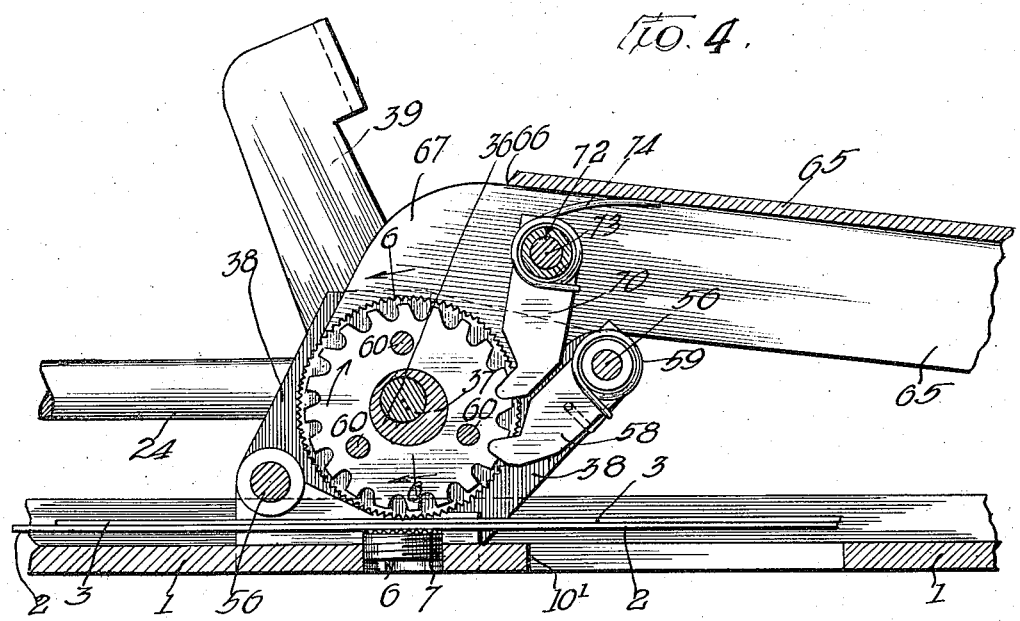
Fig. 4 is a sectional elevation thereof on the line 4—4 of Fig. 1 in the direction indicated by the arrows in Fig. 1.

I have in the drawings above referred to presented an illustrative embodiment of the invention, but the invention is to be understood as being more correctly defined by the claims appended hereto, than by the particular features shown for illustrative purposes.

I shall first describe generally the stretching tool constructed according to my invention and thereafter complete the description by a detail description of particular mechanisms involved.

Figure 5:
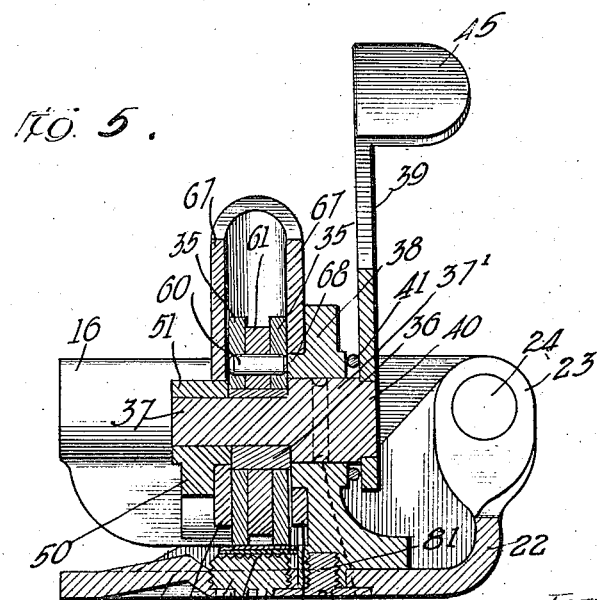
Fig. 5 is a sectional elevation thereof on the line 5—5 of Fig. 1 looking in the direction of the arrow of Fig. 1.

The stretching tool, particular reference being had in Figs. 1 and 3, comprises a somewhat extended base plate 1 which is slipped sideways under the overlapped ends 2 and 3 of a box strap applied about a bale or package. The base plate is turned up at one end 4 and there provided with a seat 5 (Fig. 2) which supports one section of the box strapping in a plane substantially above the plane of the base plate 1. Spaced rearwardly from the upturned end 4, I provide an elevated clutch plug 6, the top surface of the clutch plug 6 being burred or roughened as shown at 7 (Fig. 5). Against the strap on the clutch plug 6 operates the friction feed wheel 35 serving to advance the upper lap or end of the strap while the lower end is held stationary relative to the clutch plug. The overlapped strap ends are thus supported between the elevated points of support 5 (at the upturned end of the frame) and 7, the top of the clutch plug, and in a plane substantially raised above the plane of the base plate 1 as can be clearly seen in Fig. 3. A substantial clearance 8 is afforded by this means under the overlapped strap ends 2 and 3 to the left of the clutch plug 6. This is a particularly advantageous and important feature of construction where compressible bales of material are being strapped, for the reason that the strap ends under tension as well as the stretching tool in the stretching operation, sink sometimes a considerable distance into the compressible material of the bale so that if a stretching tool be employed wherein no clearance is provided under the strap at its overlap, it is difficult to join the two ends together by some kind of a sealing operation.

In Fig. 3, I have shown the tool of my invention as applied upon a bale such as a cotton bale, wherein the base plate of the tool 1 is shown as sunk a considerable distance into the body of the bale. Nevertheless, the clearance 8 is maintained, and a crimping tool or other joining apparatus may be applied to the overlapped strap ends without difficulty. This is rendered particularly easy by the considerable breadth of the base plate 1 as shown in Fig. 1, which affords plenty of room crosswise of the base plate 1, in which the operator may apply a sealing tool.

In order to permit the easy application of the base plate to bales or packages of various sizes, I provide a slot or recess 10 in the base plate 1. The strap ends 3 may pass either over the rearmost shoulder 11 of the base plate 1 or in the case of a shorter, smaller bale or where the tool is applied near a corner thereof the strap end may pass down though the slot 10 and over its shoulder 10', in either case the clearance above described being perfectly maintained for the sealing operation.

In order to maintain the strap end 2 in predetermined position with respect to the stretching mechanisms at the upturned end 4 of the base plate, I provide a gate mechanism as follows:—

Inwardly from the seat 5 (Fig. 2), I provide a vertical shoulder 12 on the upturned end 4 of the base plate, and at the inner side of the base plate is the upward extension 13 of the base plate. Pivotally mounted at this point, is a gate construction comprising the arm 15 provided with a rounded top 16 and a depending web 17. The depending web 17 is provided upon its lower face with a cutaway portion 18 and a vertical shoulder 19 co-operating with the seat and vertical shoulder 12, to form a slot which will maintain the strap accurately in correct alinement with the clutch plug 6. In Fig. 2 is shown, in dotted lines, the gate structure 15 in elevated position. As the tool is slipped sideways on the strapping, the strapping itself moves into the flared entrance 20 between the gate 15 and the edge 4, base plate 1 and into position shown in Fig. 2. When it is desired to remove the tool from the strap, the gate 15 may be raised into the position shown in dotted lines in Fig. 2.

At its inner side, the plate 1 is turned up as indicated at 22 along its whole length and is provided with an additional integral vertical web 23 about midway of its length. Between the projection 23 and the projection 13 at the forward corner of the base plate is mounted the handle rod 24, while a bolt 25 passes through the forked arms 26 of the gate 15 and through the intervening rounded upper end 27 of the upward projection 13. This affords a pivotal mounting for the gate 15 as well as maintaining the handle rod 24 firmly in position.

In the operation of the tool it will be understood that the operator may rest one of his hands either upon the rounded top 16 of the gate 15 or upon the handle 24 to steady the tool in its operation.

In applying the tool, it is slipped sideways over overlapped strap ends, the strap feeding automatically under the gate structure as previously described, and to get the strap safely onto the top of the clutch plug 6 (Fig. 5) I provide an incline 30 formed integrally in the base plate which leads the strap as the tool is applied.

I will now describe the strap feeding mechanism.

Co-operating with the clutch plug 6 is a feed wheel comprising two similar toothed discs 35. This wheel is intermittently pawl operated in the direction shown by the curved arrow of Fig. 4 and serves to pull the top length 3 of strap to the left (Fig. 4) while the clutch plug 6 maintains the lower length 2 of the strap in relatively stationary position, thereby stretching the strap and forming an overlap to the left of the feed wheel 35 and in the position shown in Fig. 1 where a reinforcing girth or seal may readily be applied thereto.

The feed wheel 35 is moved vertically into and out of engagement with the strap by an eccentric 36 upon which the feed wheel is revolubly mounted (Figs. 4 and 5). The eccentric 36 is shrunk or otherwise suitably secured upon a shaft 37 having an enlarged portion 37' revolubly mounted in a vertical center plate 38 secured to the base. A handle 39 is mounted upon the inner end 40, and a spring 41 tends to urge the handle in a clockwise direction (Fig. 4) so as to keep the feed wheel 35 pressed downwardly against the strap under the feed wheel. To release the feed wheel 35 from their engagement with the strap, it is only necessary to push forwardly upon an enlarged thumb plate 45 on the handle 39, which rocks the eccentric in a counterclockwise direction (Fig. 4) thereby raising the feed wheels 35.

I will now describe the details of the mounting of the feed wheels. The central plate 38 previously referred to is welded or otherwise suitably secured to the bottom plate 1 (Fig. 5) and projects upwardly therefrom. In this plate the enlarged portion 37' of the shaft 37 is revolubly mounted, a groove 47 being provided in which a pin 48 driven downwardly through the central plate (Figs. 1 and 5) is engaged to hold the shaft 36 from longitudinal movement.

To support the other end of the shaft 37, I provide a strap 50 having at its center a boss 51 in which the outer end of the shaft 37 is revolubly mounted. The strap 50 is provided at either end (Fig. 8) with a boss 52 terminating in a cup, while upon the central plate 38 and aligned with the boss 52 is a projecting boss 54 having a reduced extension 55. The bosses 52 and 54 are suitably apertured and threaded. The boss 55 is received in the cup of the boss 52 and the whole is bound together as by a screw 56 the same construction being adapted at either end of the strap 50. This construction not only firmly supports the shaft 37 at its outer end but provides, conveniently, a bearing between the bosses 52 and 54 upon which hangs a retaining pawl for the feed wheels. Thus the retaining pawl 58 is revolubly mounted upon the extension 55 above referred to and held to its duty by a coil spring 59 also coiled about upon the extension 55 and bearing at one end upon the strap 50 and at the other underneath the pawl 58.

To advance the feed wheel 35, I employ a pawl and ratchet mechanism. The feed wheels 35 are connected by welded pins 60 to a ratchet 61 firmly mounted between them and it is through the ratchet that the feed wheel 35 is operated. The means for operating the feed wheel 35 consists of a handle 65, comprising preferably a single piece of metal bent over so as to provide a rounded top which is cut away at 66 leaving two parallel depending flanges 67. The flanges 67 straddle the feed wheels 35 and are provided with aligned apertures of different sizes by which means the handle is pivotally mounted with respect to the actuating shaft 37 of the feed wheel. The flange 67 (to the left Fig. 5) is thus revolubly mounted upon an inwardly projecting portion of the boss 51 on the strap 50; while the flange 67 (to the right Fig. 5) is mounted upon a boss 68 upon the central plate 38.

Between the two side flanges of the handle 65 is the driving pawl 70 which operates upon the ratchet 61 in a manner immediately apparent from Fig. 4. This driving pawl is hung from a projection 71 on the elongated nut 72, the flange 71 telescoping within an annular recess in the bolt 73, these telescoping bolts being secured in aligned apertures in the flange of the handle 65. A spring 74 bearing against the handle 65 and against the back of the pawl 70 holds this pawl to its duty.

To permit the adjustment of and locking of the clutch plug 6, the plug is threaded, and screwed upwardly through the bottom of the plate 1. It has upon its lower face a slotted projection 78, provided with a plurality of recesses 79 adapted to lock with the circular screw head 80 forming a part of the screw 81 also screwed in through the bottom plate of the machine and into the central vertical plate 38 thereof. By this means the clutch plug can be adjusted within a quarter of a turn and locked in adjusted position, by the use of an ordinary screw driver.

The operation of the tool will be clear from the preceding description. Briefly summarized; the operator taking the tool by means of the handle 24, slips it sideways onto the strap, the strap automatically opening the gate construction 15 at the forward end of the tool (see Fig. 2) and riding over the incline 30 and onto the clutch plug 6 and coming to rest at this point against the vertical face of the central plate 38 (Fig. 5). The strap length is thus held in correct alinement between the slot at the gate construction 15 (Fig. 2) and over the clutch plug (Fig. 5). In this position, the strap to the left of the stretching apparatus (Fig. 3) is substantially cleared above the bottom plate 1 of the tool, and the strap to the right may pass either over the end 11 of the tool or over the shoulder 10'. During the operation of applying the tool to the strap, the operator presses forwardly on the thumb piece 45 of the lever 39 to raise the feed wheels and permit the strap to pass between them and the clutch plug. As soon as the tool is applied to the strap, the lever 39 is released, the feed wheels immediately come to bear upon the strap, and the operation of the handle 65 intermittently rotates the feed wheels 35 in the direction indicated by the arrow of Fig. 4, thus propelling the upper end of the strap forwardly while the lower end remains relatively stationary because engaged by the clutch plug 6. This operation may be continued until the desired tension is placed upon the strap, the tool meanwhile being steadied by the operator's grip either upon the rounded top 16 of the gate 15 or upon the rod 24. As soon as the strap is sufficiently tight the overlapped portions immediately to the left of the stretching apparatus (Figs. 1 and 3) may be joined as by applying a reinforcing girth and crimping it and the enclosed strap simultaneously together.

It will be noted that the tool presents desirable advantages of simplicity of construction and ease of operation and particularly that no matter how far the tool sinks into a soft bale or the like, there will be provided plenty of clearance and plenty of room for the strap joining operation which follows the stretching operation. It is also an advantageous feature that the eccentric and its operating handle 39 are so arranged that in the operation of the tool, any friction of the feed wheels upon their bearings due to the unsymmetric pull on the feed wheels serves to cause those wheels to grip the strap tighter. Thus, referring to Fig. 4, as the feed wheels are rotated by the actuating pawl 70, any friction between those feed wheels and the eccentric 36 tends to move the eccentric in a clockwise direction and thus tighten the grip of the tool upon the strap Inasmuch as sometimes, and particularly when the tool is not well lubricated, considerable friction develops between the feed wheels and their bearings, this feature is advantageous

Having now described my invention, I claim:

1. A stretching tool comprising, in combination, means for engaging the overlapped ends of a metal strap and for tightening the strap about a bale or package, a plate underlying the overlapped portions of the strap in the stretching operation, and means for maintaining a substantial clearance between the plate and the overlapped portions of the strap in the stretching operation to permit convenient application of a reinforcing girth or the like to the strap.

2. In a stretching tool, means for stretching a box strap about a bale or package, a plate connected with said stretching means, said plate being of a width substantially wider than the strap and adapted to underlie the overlapped strap ends during the stretching operation, means to maintain a substantial clearance between the plate and the overlapped strap ends during the stretching operation, whereby a reinforcing girth may be conveniently applied to said overlapped strap ends irrespective of the sinking of the plate and strap into the bale or package in the stretching operation.

3. In a stretching tool for box strapping, a base plate, means mounted on the base plate for feeding overlapped strap ends relatively past each other, said feeding means stretching the strapping from a single point of contact therewith at the overlapped strap ends, said feeding means including means to maintain said strap ends substantially above the base plate at the single point of action of said feeding means, and means on the base plate spaced from said feeding means to maintain another point on the overlapped strap ends substantially above the base plate.

4. In a stretching tool, a base plate, a clutch plug mounted therein and substantially above the surface thereof, a feed wheel cooperating with said clutch plug, a raised portion on said base plate, said raised clutch plug and portion being adapted to maintain a clearance between the strap ends being stretched and the base plate.

5. In a stretching tool, a base plate having a raised lip adjacent one end thereof and a raised clutch plug spaced therefrom, and feeding means for box strapping cooperating with said raised clutch plug.

6. In a stretching tool, a base plate having a raised lip adjacent one end thereof and a raised clutch plug spaced therefrom, feeding means for box strapping and the like cooperating with said raised clutch plug, and a pivoted strap holder and guide adapted to cooperate with said raised lip.

7. In a stretching tool, a base plate, strap feeding means thereon, raised portions on the base plate adapted to maintain a clearance between overlapped strap ends and the base plate, and a pivoted strap holder and guide cooperating with one of said raised portions.

8. In a stretching tool a base plate, strap feeding means thereon, said base plate and feeding means being adapted to be slipped sidewise into operative relationship with overlapped strap ends, and a plurality of shoulders on said base plate affording alternative distances on the base plate over which the strap may be applied, in accordance with the size of the bale or package to be strapped.

In witness whereof, I hereunto subscribe my name this 12th day of April, A. D. 1920.

ARTHUR G. G. GUENTHER.